J. AINSLIE.
ROTARY WEEDER AND CULTIVATOR.
APPLICATION FILED FEB. 20, 1911.
1,003,408.
Patented Sept. 19, 1911.
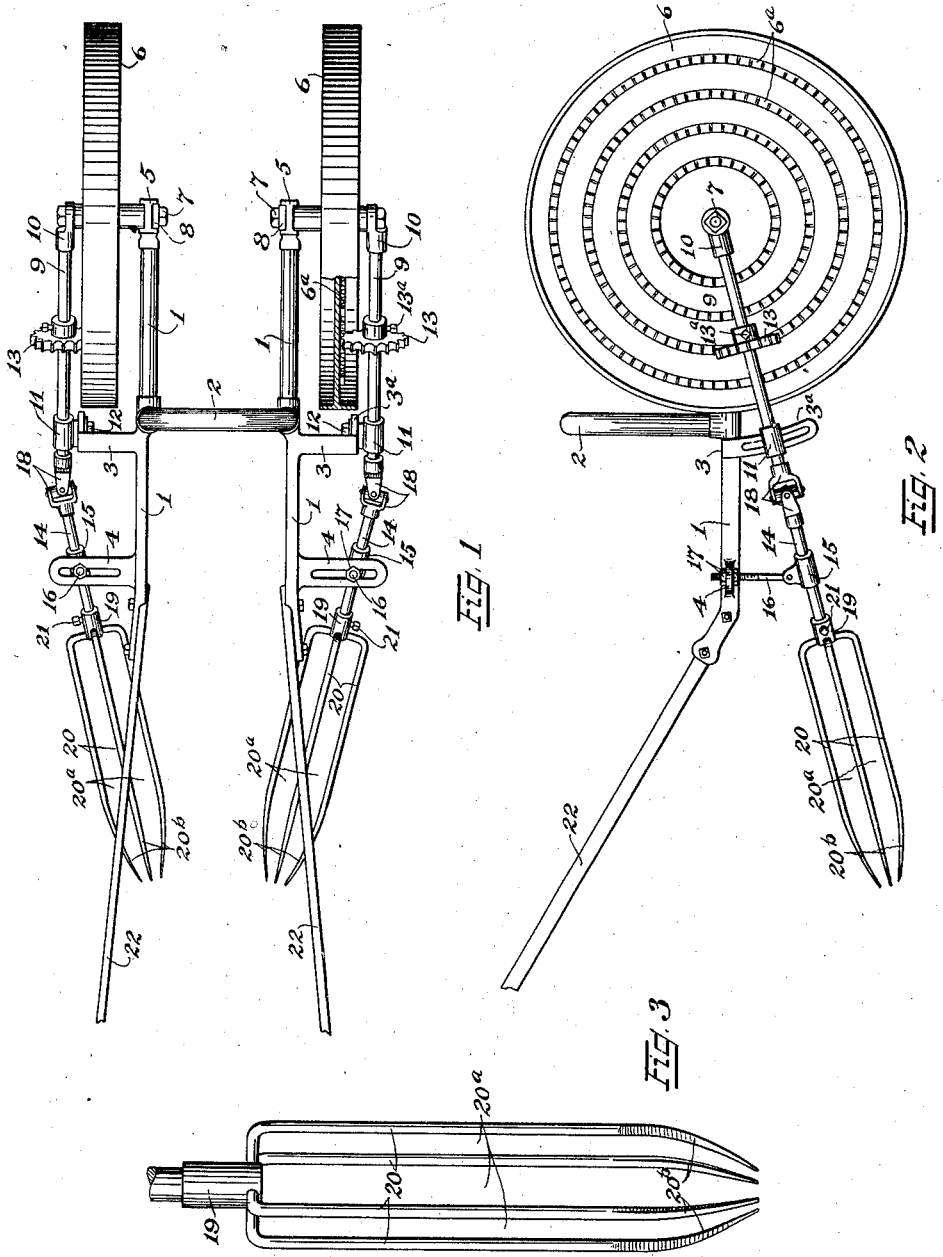
Witnesses:
H. C. Valentine
E. P. Schlosser
Inventor,
Joseph Ainslie
by Obed B. Billman
Attorney.

UNITED STATES PATENT OFFICE.

JOSEPH AINSLIE, OF LEAMINGTON, ONTARIO, CANADA.

ROTARY WEEDER AND CULTIVATOR.

1,003,408.  Specification of Letters Patent.  Patented Sept. 19, 1911.

Application filed February 20, 1911. Serial No. 609,548.

*To all whom it may concern:*

Be it known that I, JOSEPH AINSLIE, citizen of the Dominion of Canada, residing at Leamington, in the Province of Ontario and Dominion of Canada, have invented certain new and useful Improvements in Rotary Weeders and Cultivators, of which the following is a specification.

My invention relates to improvements in rotary weeders and cultivators, the primary object of the invention being to provide a generally improved garden implement of exceedingly simple, cheap, and efficient construction, better adapted to its intended purposes than any other device of the same class with which I am acquainted.

A further object is to provide a generally improved rotary weeder or cultivator element particularly designed and adapted for use in the weeding or cultivating of onions and similar vegetables, the improved implement being adapted to straddle the rows of plants or vegetables, whereby the rotary weeders or cultivator elements may be brought in close proximity thereto for the purpose of stirring or agitating the soil along and between the growing plants and vegetables without in any way injuring the latter and at the same time avoiding any liability of covering the same by the loosened soil.

A still further object is to provide specially designed and formed open pronged rotary weeder or cultivator elements adapted to revolve transversely to the line of travel or draft of the improved implement and particularly designed and adapted to pass directly under the upwardly and outwardly extending leaves of the vegetable, said rotary elements being adapted to revolve from each other at their tops on either side of the row of plants or vegetables without in any way injuring the vegetable, and by reason of the particular arrangement and relative disposition of the weeder or cultivator prongs having a quick, successive action upon the subjacent soil, for the purpose of destroying young growing weeds, so much desired in the cultivation of vegetables of the class indicated.

A still further object is to provide a hand operated garden implement having its various parts adjustably mounted whereby the same may be arranged and adjusted to meet the varying demands of actual service.

With the above mentioned and other objects in view, the invention consists in the novel construction, arrangement, and combination of parts, hereinafter described, illustrated in the accompanying drawings, and particularly pointed out in the appended claims.

Referring to the drawings, forming a part of this specification, Figure 1, is a top plan view of a weeder or cultivator constructed in accordance with this invention. Fig. 2, a side elevation of the same. Fig. 3, an enlarged detail view of one of the improved pronged rotary weeders or open cultivator members.

Similar numerals of reference designate like parts throughout all the figures of the drawings.

The improved weeder or cultivator comprises a frame preferably consisting of side beams or members 1, connected by an arched yoke 2, and provided at their sides with front and rear brackets 3 and 4, respectively. The brackets 3 and 4 are preferably slotted for the purpose of providing for the adjustments hereinafter described, said brackets preferably extending laterally from the side beams as indicated most clearly in Fig. 1 of the drawings, and said front brackets being preferably provided with depending portions 3ª, as shown.

The side beams or members 1, are provided with bifurcated heads 5, adapted to adjustably carry the driving wheels 6, by means of axle bolts 7, passing through suitable openings in vertically disposed securing bars 8, on the inner sides of said heads. As a means for driving or rotating the improved pronged rotary weeder members hereinafter described, driving shafts 9, are mounted on the outer sides of said driving wheels by means of bearing heads 10, movably mounted on the axle bolts 7, and bearing sleeves 11, slidably and adjustably mounted in the slots of the depending portions 3ª, of the front brackets by means of adjusting bolts 12. Each driving shaft 9, is provided with a gear 13, adapted to mesh with the several stepped gears 6ª, of the driving wheels, said gears 13, being longitudinally mounted on the driving shafts 9, in any suitable and convenient manner, as for example,—by means of set bolts 13ª.

As a means for universally connecting the pronged rotary weeder members or cultivator elements hereinafter described to the driving shafts 9, weeder carrying shafts 14, are adjustably mounted and connected to the rear brackets 4, by means of pivotally mounted bearing sleeves 15, connected to bolts 16, the latter being adjustably mounted in the slots of the brackets 4, by means of adjusting bolts 17, one end of the carrying shafts 14, being connected to the driving shafts 9, by means of universal joints 18, of any suitable and convenient construction.

Each rotary weeder member or cultivator element comprises a rotary base or support, in the present instance, in the form of a sleeve 19, said rotary base or sleeve being armed with longitudinally extending weeder prongs or tines 20, said prongs or tines extending longitudinally to their axis of rotation forming an open weeder or cultivator element with interstices, gaps, or passes 20$^a$, intermediate the prongs or tines 20. The rotary weeder members or cultivator elements are adapted to extend rearwardly on either side of the row of plants being cultivated and to be moved horizontally to and from each other and adjusted vertically and horizontally at any desired angle of inclination through the medium of the adjusting bolts 12, carrying the bearing sleeves 11, and the bolts 16, carrying the sleeves 15. As a means for adjusting the rotary weeders or cultivator members longitudinally as well as providing means whereby one rotary weeder member may be advanced slightly in front of the other, the rotary supports or sleeves 19, may be adjusted upon the carrying shaft 14 through the medium of adjusting bolts 21.

The free ends of the prongs or tines 20 are preferably tapered and inturned as at 20$^b$, said inturned tapered ends 20$^b$, being adapted to form the active cultivating or soil engaging portions of the weeder prongs as indicated most clearly in Fig. 2 of the drawings this feature presenting obvious advantages particularly in connection with the gaps, or passes 20$^a$, between the prongs 20. Furthermore the relative disposition and arrangement of said rotary weeder elements with respect to the line of travel or draft of the improved cultivator or weeder make the same particularly adapted for use in connection with a hand operated garden implement provided with handles 22.

From the foregoing description, taken in connection with the accompanying drawings, the operation and advantages of my invention will be readily understood.

Having thus described some of the embodiments of my invention, what I claim and desire to secure by Letters Patent is,—

1. In a cultivator, a plurality of cylindrical weeder prongs connected to and extending from a common rotary support and having tapered converging free ends.

2. In a cultivator, a pair of open rotary cultivator elements including weeder prongs extending longitudinally of the axis of rotation of said rotary cultivator elements, and means for supporting and adjusting said cultivator elements laterally and longitudinally whereby the position of said prongs may be varied and presented at various angles of incidence to the surface being cultivated.

In testimony whereof I have affixed my signature in presence of two witnesses.

JOSEPH AINSLIE.

Witnesses:
A. L. BOLES,
ORPHA WILLON.

---

Copies of this patent may be obtained for five cents each, by addressing the "Commissioner of Patents, Washington, D. C."